US011138617B2

(12) United States Patent
Litmanovich et al.

(10) Patent No.: US 11,138,617 B2
(45) Date of Patent: Oct. 5, 2021

(54) SYSTEM AND METHOD FOR DEMOGRAPHIC PROFILING OF MOBILE TERMINAL USERS BASED ON NETWORK-CENTRIC ESTIMATION OF INSTALLED MOBILE APPLICATIONS AND THEIR USAGE PATTERNS

(71) Applicant: Verint Systems Ltd., Pituach (IL)

(72) Inventors: Gustavo Litmanovich, Netaim (IL); Eithan Goldfarb, Ness Ziona (IL)

(73) Assignee: VERINT SYSTEMS LTD., Pituach (IL)

( * ) Notice: Subject to any disclaimer, the term of this patent is extended or adjusted under 35 U.S.C. 154(b) by 663 days.

(21) Appl. No.: 14/697,841

(22) Filed: Apr. 28, 2015

(65) Prior Publication Data

US 2015/0356581 A1 Dec. 10, 2015

(30) Foreign Application Priority Data

Apr. 28, 2014 (IL) .......................................... 232316

(51) Int. Cl.
*G06Q 30/02* (2012.01)
*H04L 29/08* (2006.01)
*H04M 3/22* (2006.01)

(52) U.S. Cl.
CPC ......... *G06Q 30/0204* (2013.01); *H04L 67/22* (2013.01); *H04L 67/306* (2013.01); *H04M 3/2218* (2013.01); *H04M 2203/556* (2013.01)

(58) Field of Classification Search
None
See application file for complete search history.

(56) References Cited

U.S. PATENT DOCUMENTS 5,689,442 A 11/1997 Swanson et al.
6,404,857 B1 6/2002 Blair et al.
6,718,023 B1 4/2004 Zolotov
6,757,361 B2 6/2004 Blair et al.
(Continued)

OTHER PUBLICATIONS

Demographic information prediction based on smartphone application usage Zhen Qin; Yilei Wang; Yong Xia; Hongrong Cheng; Yingjie Zhou; et al. 2014 International Conference on Smart Computing (SMARTCOMP): 183-90;305. IEEE. (2014) (Year: 2014).*
(Continued)

*Primary Examiner* — Michael J Sittner
(74) *Attorney, Agent, or Firm* — Isus Intellectual Property PLL; Anthony Jason Mirabito

(57) ABSTRACT

Methods and systems for creating demographic profiles of mobile communication network users. A demographic classification system analyzes network traffic, so as to estimate the specific combination of application classes installed on a given terminal, and usage patterns of the applications over time. This combination of application classes and their respective usage patterns are a highly personalized choice made by the user, and is therefore used by the system to deduce the user's demographic profile. The demographic classification system operates on monitored network traffic, as opposed to obtaining explicit and accurate information regarding the installed applications from the terminal. The system then deduces the demographic profile of the user from the list of estimated application classes.

16 Claims, 2 Drawing Sheets

COLLECT NETWORK TRAFFIC BY INTERFACE — 100
SELECT A PERTINENT USER — 102
FILTER TRAFFIC OF PERTINENT USER — 104
ESTIMATE CLASSES OF APPLICATIONS INSTALLED ON USER'S TERMINAL — 106
DETERMINE APPLICATION'S USAGE PATTERN OVER TIME — 108
CREATE A DEMOGRAPHIC PROFILE OF THE USER BY ITS APPLICATIONS COMBINATION — 110

(56) References Cited

U.S. PATENT DOCUMENTS

| | | | | |
|---|---|---|---|---|
| 7,216,162 | B2 | 5/2007 | Amit et al. | |
| 7,466,816 | B2 | 12/2008 | Blair | |
| RE40,634 | E | 2/2009 | Blair et al. | |
| 7,587,041 | B2 | 9/2009 | Blair | |
| 8,010,296 | B2 * | 8/2011 | Loo | G06K 9/0051 702/19 |
| 9,152,694 | B1 * | 10/2015 | Padidar | G06F 17/30598 |
| 2006/0195361 | A1 | 8/2006 | Rosenberg | |
| 2008/0014873 | A1 | 1/2008 | Krayer et al. | |
| 2008/0261192 | A1 | 10/2008 | Huang et al. | |
| 2008/0285464 | A1 | 11/2008 | Katzir | |
| 2010/0203876 | A1 * | 8/2010 | Krishnaswamy | G06Q 30/02 455/418 |
| 2012/0020293 | A1 * | 1/2012 | Nix, Jr. | H04L 41/0856 370/328 |
| 2013/0091146 | A1 | 4/2013 | Stenger | |
| 2013/0166730 | A1 * | 6/2013 | Wilkinson | G06Q 30/02 709/224 |
| 2013/0325607 | A1 * | 12/2013 | Delug | G06Q 30/0269 705/14.53 |
| 2014/0279027 | A1 * | 9/2014 | Chou | G06Q 30/0267 705/14.64 |
| 2014/0330643 | A1 * | 11/2014 | Grigorovici | G06Q 30/0267 705/14.52 |
| 2015/0095160 | A1 * | 4/2015 | Ma | G06Q 30/0267 705/14.64 |

OTHER PUBLICATIONS

Altshuler, Y., et al., "How Many Makes a Crowd? On the Evolution of Learning as a Factor of Community Coverage," LNCS 7227, 2012, pp. 43-52.
Altshuler, Y., et al., Incremental Learning with Accuracy Prediction of Social and Individual Properties from Mobile-Phone Data, 2011, IEEE, 10 pages.
Altshuler, Y., et al., "Trade-Offs in Social and Behavioral Modeling in Mobile Networks," LNCS 7812, 2013, pp. 412-423.
Argamon, S., et al., "Automatically Profiling the Author of an Anonymous Text," Communication of the ACM, vol. 52, No. 2, Feb. 2009, pp. 119-123.
Argamon, S., et al., "Gender, Genre, and Writing Style in Formal Written Texts," Text & Talk, vol. 23, Issue 3, 2003, 32 pages.
Aho, Alfred V., et al., "Efficient String Matching: An Aid to Bibliographic Search," Communication of the ACM, Jun. 1975, vol. 18, No. 6, pp. 333-340.
Atkinson, M., et al., "Near Real Time Information Mining in Multilingual News," World Wide Web Conference, Apr. 20-24, 2009, 2 pages.
Cloudshield, Inc., "Lawful Intercept Next-Generation Platform," 2009, 6 pages.
Coffman, T., et al., "Graph-Based Technologies for Intelligence Analysis," CACM, Mar. 2004, 12 pages.
Corney, M., et al. "Gender-Preferential Text Mining of E-mail Discourse," Proceedings of the 18the Annual Computer Security Applications Conference, 2002, 8 pages.
Dharmapurikar, Sarang, et al., "Fast and Scalable Pattern Matching for Network Intrusion Detection Systems," IEEE Journal on Selected Areas in Communications, Oct. 2006, vol. 24, Issue 10, pp. 1781-1792.
De Vel, O., et al., "Language and Gender Author Cohort Analysis of E-mail for Computer Forensics," Defense Science and Technology Organisation, Australia, 2002, 16 pages.
Eagle, N., et al., "Inferring friendship network structure by using mobile phone data," PNAS, vol. 106, No. 36, 2009, pp. 15274-15278.
Estival, D., et al., "Author Profiling for English Emails," Proceedings of the $10^{th}$ Conference of the Pacific Association for Computational Linguistics, 2007, pp. 263-272.
Fisk, Mike, et al., "Applying Fast String Matching to Intrusion Detection," Los Alamos National Laboratory and University of California San Diego, Jun. 1975, 22 pages.
FoxReplay Analyst, Fox Replay BV, http//www.foxreplay.com, Revision 1.0, Nov. 2007, 5 pages.
FoxReplay Analyst Product Brochure, Fox-IT BV, http//www.foxreplay.com, 2006, 2 pages.
Goldfarb, Eithan, "Mass Link Analysis: Conceptual Analysis," Jun. 24, 2007, Version 1.1, 21 pages.
Goswami, S., et al., "Stylometric Analysis of Bloggers' Age and Gender," Proceedings of the Third International ICWSM Conference, 2009, pp. 214-217.
Lakhina, A., et al., "Mining Anomalies Using Traffic Feature Distributions," SIGCOMM, 2005, pp. 217-228.
Mohrehkesh, S., et al., "Demographic Prediction of Mobile User from Phone Usage," Proceedings Mobile Data Challenge by Nokia Workshop, Newcastle, United Kingdom, 2012, 4 pages.
Navarro, Gonzalo, et al., "Flexible Pattern Matching in Strings: Practical On-Line Search Algorithms for Texts and Biological Sequences," Cambridge University Press, 2002, 166 pages.
Netronome SSL Inspector Solution Overview White Paper, "Examining SSL-encrypted Communications," 2010, 8 pages.
Pan, Long, "Effective and Efficient Methodologies for Social Network Analysis," Dissertation submitted to faculty of Virginia Polytechnic Institute and State University, Blacksburg, Virginia, Dec. 11, 2007, 148 pages.
Rangel, F., et al., "Overview of the Author Profiling Task at PAN 2013," CLEF 2013 Evaluation Labs, 2013, 13 pages.
Rohde & Schwarz GmbH & Co. KG, "ACCESSNET-T, DMX-500 R2, Digital Mobile eXchange," Product Brochure, Secure Communications, Mar. 2000, 4 pages.
Rohde & Schwarz GmbH & Co. KG, "ACCESSNET-T IP," Product Brochure, Secure Communications, Jan. 2000, 4 pages.
Rohde & Schwarz GmbH & Co. KG, "R&S AllAudio Integrated Digital Audio Software," Product Brochure, Radiomonitoring & Radiolocation, Feb. 2000, 12 pages.
Rohde & Schwarz GmbH & Co. KG, "R&S AllAudio Integrierte digitale Audio-Software," Product Brochure, Feb. 2002, 12 pages.
Rohde & Schwarz GmbH & Co. KG, "R&S AMMOS GX425 Software," http://www2.rohde-schwarz.com/en/products/radiomonitoring/Signal_Analysis/GX425, Jul. 30, 2010, 1 page.
Rohde & Schwarz GmbH & Co. KG, "R&S AMMOS GX430 PC-Based Signal Analysis and Signal Processing Standalone software solution," http://www2.rohde-schwarz.com/en/products/radiomonitoring/Signal_Analysis/GX430, Jul. 30, 2010, 1 page.
Rohde & Schwarz GmbH & Co. KG, "Digital Standards for R&S SMU200A, R&S SMATE200A, R&S SMJ100A, R&S SMBV100A and R&S AMU200A," Data Sheet, Test & Measurement, May 2000, 68 pages.
Rohde & Schwarz GmbH & Co. KG, "Integrated Digital Audio Software R&S AllAudio," Specifications, 2000, 8 pages.
Rohde & Schwarz GmbH & Co. KG, "R&S RA-CM Continuous Monitoring Software," Product Brochure, Radiomonitoring & Radiolocation, Jan. 2001, 16 pages.
Rohde & Schwarz GmbH & Co. KG, "R&S RAMON COMINT/CESM Software," Product Brochure, Radiomonitoring & Radiolocation, Jan. 2000, 22 pages.
Rohde & Schwarz GmbH & Co. KG, "R&S TMSR200 Lightweight Interception and Direction Finding System," Technical Information, Aug. 14, 2009, 8SPM-ko/hn, Version 3.0, 10 pages.
Schulzrinne, H., et al., "RTP: A Transport Protocol for Real-Time Applications," Standards Track, Jul. 2003, 89 pages.
Sheng, Lei, et al., "A Graph Query Language and its Query Processing," IEEE, Apr. 1999, pp. 572-581.
Soghoian, Christopher, et al., "Certified Lies: Detecting and Defeating Government Interception Attacks Against SSL," 2010, 19 pages.
Stamatatos, E., "Author identification: Using text sampling to handle the class imbalance problem," Science Direct, Information Processing and Management, vol. 44, 2008, pp. 790-799.
Svenson, Pontus, et al., "Social network analysis and information fusion for anti-terrorism," CIMI, 2006, 8 pages.
Tongaonkar, Alok S., "Fast Pattern-Matching Techniques for Packet Filtering," Stony Brook University, May 2004, 44 pages.
Verint Systems Inc., "Mass Link Analysis: Solution Description," Dec. 2008, 16 pages.

(56) References Cited

OTHER PUBLICATIONS

Yu, Fang, et al., "Fast and Memory-Efficient Regular Expression Matching for Deep Packet Inspection," ANCS'06, San Jose, California, Dec. 3-5, 2006, 10 pages.
Yu, Fang, et al., "Gigabit Rate Packet Pattern-Matching Using TCAM," Proceedings of the 12th IEEE International Conference on Network Protocols (ICNP'04), 2004, 10 pages.

* cited by examiner

INTERNET NETWORK
36
22
34
GGSN
HLR
32
MSC
30
28
SGSN
29
SGSN
38
38
46
INTERFACE
48
PROCESSOR
40
26
RNC
27
PCU
24
NODE B
UMTS Radio Network
25
BSS
GSM Radio Network
20
20
20

SYSTEM AND METHOD FOR DEMOGRAPHIC PROFILING OF MOBILE TERMINAL USERS BASED ON NETWORK-CENTRIC ESTIMATION OF INSTALLED MOBILE APPLICATIONS AND THEIR USAGE PATTERNS

FIELD OF THE DISCLOSURE

The present disclosure relates generally to mobile communication networks, and particularly to methods and systems for demographic profiling of mobile terminal users.

BACKGROUND OF THE DISCLOSURE

Mobile communication terminals are a primary source for collecting information such as social, behavioral, and environmental data. For example, Altshuler et al. describe a study of the effects of sensors information on the ability to predict personal features of community members, in "How Many Makes a Crowd? On the Evolution of Learning as a Factor of Community Coverage," 2012 International Conference on Social Computing, Behavioral-Cultural Modeling, & Prediction (SBP12), Lecture Notes in Computer Science (LNCS) 7227, pages 43-52, April, 2012, whose disclosure is incorporated herein by reference.

As another example, Mohrehkesh et al. describe a prediction of user demographic attributes by tracking mobile phone usage such as call log, visited GSM cell information, visited Bluetooth devices, visited Wireless LAN devices, and accelerometer data, in "Demographic Prediction of Mobile User from Phone Usage," Mobile Data Challenge (MDC) 2012 Workshop, Newcastle, UK, Jun. 18-19, 2012, which is incorporated herein by reference.

U.S. Patent Application Publication 2014/0040171, whose disclosure is incorporated herein by reference, describes content-based demographic estimation of users of mobile devices and usage thereof.

SUMMARY OF THE DISCLOSURE

An embodiment that is described herein provides a system including an interface and a processor. The interface is configured to receive traffic from a mobile network. The processor is configured to analyze the traffic so as to estimate from the traffic of a given communication terminal classes of applications that are installed on the given communication terminal, while specific identities of one or more of the applications remain unrecognized, to determine respective usage patterns of one or more of the application classes over time, and to deduce a demographic profile of a user of the given communication terminal from the estimated application classes and usage patterns.

In an embodiment, the processor is configured to estimate the classes of the applications and deduce the demographic profile irrespective of content of the traffic. In another embodiment, the processor is configured to analyze the traffic passively, without communicating with the given communication terminal. In some embodiments, at least part of the traffic is encrypted.

In an embodiment, the processor is configured to obtain metadata of a recognized application from an application store, to assess a similarity between the metadata and attributes of an unrecognized application installed on the given communication terminal, and to classify the unrecognized application based on the similarity. In another embodiment, the processor is configured to exclude one or more predefined classes of the applications prior to deducing the demographic profile.

In some embodiments, the demographic profile includes one or more demographic attributes, and the processor is configured to assign a confidence score to at least one of the demographic attributes. In other embodiments, the demographic profile includes at least one demographic attribute selected from a group of attributes consisting of age, gender, ethnic origin, mother tongue, marital status, education, occupation, employment, and income level, number of people in household and residence type.

There is additionally provided, in accordance with an embodiment that is described herein, a method including receiving traffic from a mobile network. The traffic is analyzed so as to estimate from the traffic of a given communication terminal classes of applications that are installed on the given communication terminal, while specific identities of one or more of the applications remain unrecognized. Usage patterns of one or more of the application classes are determined over time, and a demographic profile of a user of the given communication terminal is deduced from the estimated application classes and usage patterns.

The present disclosure will be more fully understood from the following detailed description of the embodiments thereof, taken together with the drawings in which:

DETAILED DESCRIPTION OF EMBODIMENTS

Overview

Figure 1:
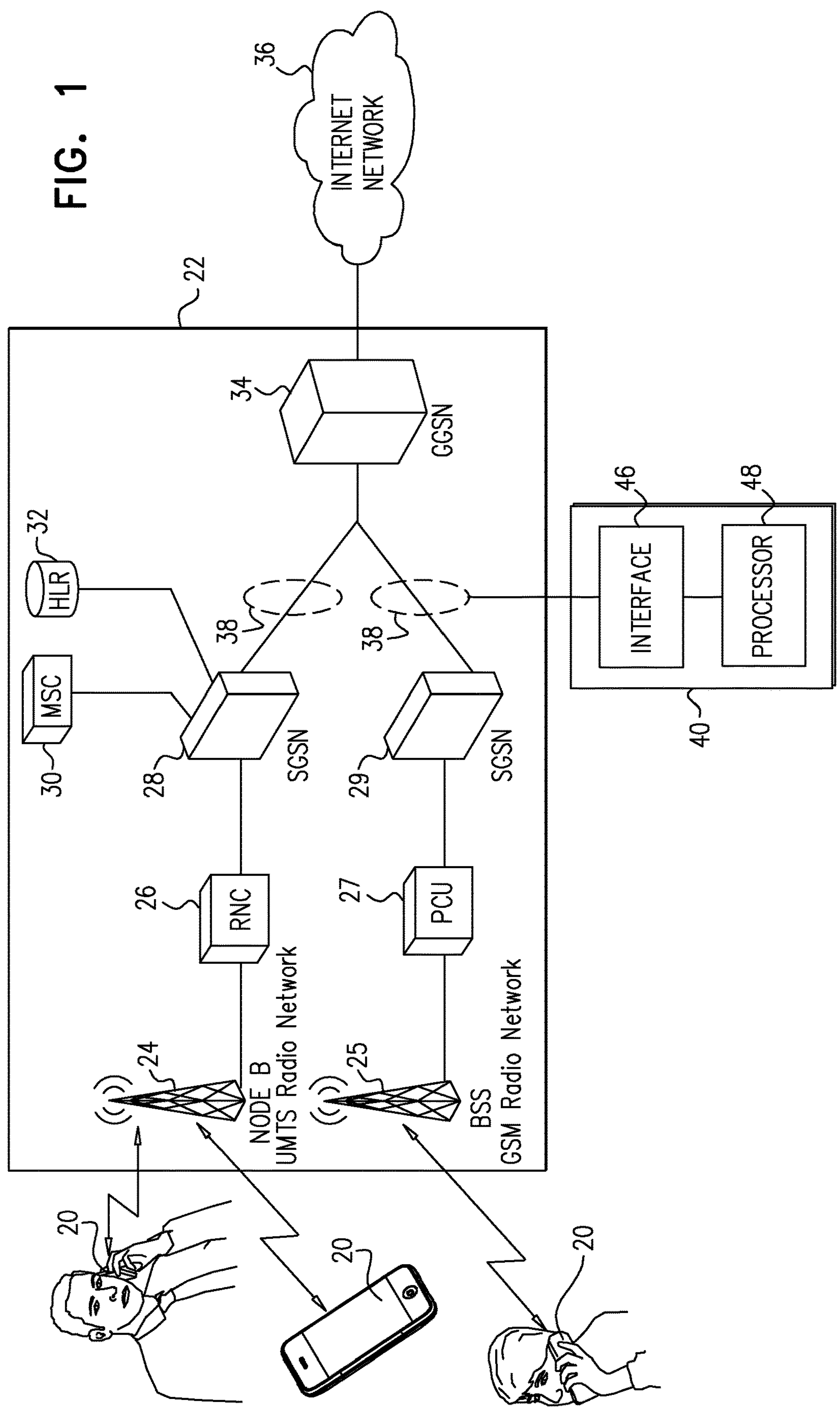
FIG. 1 is a block diagram that schematically illustrates a mobile communication network and a demographic classification system, in accordance with an embodiment that is described herein.

Demographic profiling of mobile network users is important in a variety of applications, such as commercial ads, fraud detection, law enforcement and many others. A user's demographic profile may comprise attributes such as age, gender, ethnic origin, education and income, among others.

Embodiments that are described herein provide methods and systems for creating demographic profiles of mobile communication network users. In an embodiment, a demographic classification system analyzes network traffic, so as to estimate the specific combination of application classes installed on a given terminal, and usage patterns of the applications over time. This combination of application classes and their respective usage patterns are a highly personalized choice made by the user, and is therefore used by the system to deduce the user's demographic profile. In some embodiments, the system may exclude some applications or application classes, for example the most popular or too rare applications, to improve the profiling accuracy.

The disclosed demographic classification system operates on monitored network traffic, as opposed to obtaining explicit and accurate information regarding the installed applications from the terminal. Thus, in many practical scenarios the system does not identify each specific application by name, but rather classifies the applications to classes (also referred to as families or types), such as VoIP, social-network, file-sharing, e-mail, Web-surfing, media streaming, short messaging, or user-to-user instant messaging applications. The system then deduces the demographic profile of the user from the list of estimated application classes.

As can be appreciated from the description above, the disclosed techniques are highly effective in classifying unrecognized applications, e.g., applications that have not been encountered before, or applications that cannot be recognized because of encryption of other reason.

Several example techniques for identifying and classifying unrecognized applications based on network traffic, and several example techniques for deducing demographic parameters from the estimated combination of installed applications and usage patterns over time, are described herein.

A feature of the demographic profiling techniques described herein is that they do not use or rely on the traffic content in any way. As such, the disclosed techniques can operate on encrypted traffic, traffic in an unrecognized foreign language, or traffic whose content is unusable for any other reason. Moreover, the heavy computational load associated with content analysis is avoided.

The disclosed system collects the network traffic passively, without installing any dedicated component on the terminals being profiled. As such, the disclosed techniques do not require cooperation of users, and can be used for profiling users whose terminals are inaccessible or who do not wish to install dedicated agents. The demographic profiling techniques described herein can be used by various parties, including network operators, who can use this solution to profile users whose personal information is unknown to the operator, such as prepaid users.

In some embodiments, the demographic profiling system can classify applications into classes based on application ontology as provided by the application store (e.g., games, news, productivity, travel or finance).

As can be appreciated, the disclosed network-centric approach relies solely on attributes that can be measured through the public network, rather than using installed agents on the users' terminals or using well-defined lists of installed applications. Moreover, this approach does not rely on the analysis or understanding of underlying content, but on metadata of the estimated applications (e.g., volume, time and shape) and their usage patterns. Therefore, the disclosed techniques reduce computational complexity and also avoid breaching of user privacy limitations. Furthermore, the disclosed network-centric approach makes the disclosed technique insensitive to the mobile terminal type, brand, model, operating system, and other attributes related to the terminal.

System Description

FIG. 1 is a block diagram that schematically illustrates a mobile communication system 22 and a demographic classification system 40, in accordance with an embodiment that is described herein. System 22 provides various mobile communication services to terminals 20, e.g., mobile phones, Personal Digital Assistants (PDAs), mobile or tablet computers, or other wireless-enabled computing devices of network users.

In the example of FIG. 1, system 22 comprises a Universal Mobile Telecommunications System (UMTS) network and a GSM network, which are connected to a Gateway General Packet Radio Service Support Node (GGSN) 34. In other embodiments, system 22 may comprise one or more wireless networks operating in accordance with any suitable communication protocol or protocols.

The terms "user" and "terminal" referring to a user's terminal (e.g., a mobile phone or a tablet) and are used interchangeably in this disclosure. In the example of FIG. 1, the UMTS network comprises one or more base stations 24 (known as NodeB in UMTS networks) that communicate with terminals 20, one or more Radio Network Controllers (RNC) 26 that are responsible for controlling the NodeBs, and one or more Service General Packet Radio Service Support Nodes (SGSN) 28 that handle packet switched data within the network. SGSN 28 is connected to one or more mobile Switching Centers (MSC) 30 that control the network switching subsystem elements. SGSN 28 and MSC 30 are often co-located, as shown in FIG. 1.

SGSN 28 is connected to a home Location Register (HLR) 32, which comprises a database comprising pertinent data regarding terminals authorized to use the UMTS network.

In the embodiment of FIG. 1, the GSM network operates in parallel to the UMTS network and comprises GSM base stations (known as BS) 25 that communicate with terminals 20, Packet Control Units (PCUs) 27 that are responsible for controlling the BSSs with regard to packet data, and one or more SGSNs 29 that are connected to one or more MSCs and HLRs (similar to those of the UMTS network, not shown in FIG. 1). SGSN 28 (of the UMTS network) and SGSN 29 (of the GSM network) are connected to GGSN 34, which connects system 22 to internet network 36.

The configuration of system 22 shown in FIG. 1 is depicted purely by way of example. In alternative embodiments, the disclosed techniques can be used with various other network configurations.

Demographic classification system 40 is connected to the network or networks of system 22, and is suitable to communicate with any configuration of networks. System 40 collects network traffic, extracts the traffic for each of the selected users, and estimates classes of installed applications (recognized and/or unrecognized, e.g., encrypted), and their respective usage patterns over time, to create demographic profiles for selected users.

In the example of FIG. 1, demographic classification system 40 comprises an interface 46, which monitors and collects traffic from the networks of system 22, and a processor 48, which estimates classes of installed mobile applications and respective usage patterns for a given terminal 20, and uses models such as machine learning models to create demographic profiles of the users of selected terminals 20 based on a classification and combination of the classified applications and their usage patterns over time.

Interface 46 is connected to the networks of system 22 at one or more points 38. In the example of FIG. 1, points 38 are located in the interfaces between SGSNs 28 and 29 and GGSN 34. Alternatively, however, points 38 can be located at any suitable location within system 22 in order to collect network traffic. For example, in the UMTS network points 38 can be located between SGSN 28 and GGSN 34, between RNC 26 and SGSN 28, and/or between SGSN 28 and MSC 30. In the GSM network, points 38 can be located: between SGSN 29 and GGSN 34, between PCU 27 and SGSN 28, and/or between SGSN 28 and MSC of GSM network (not shown in FIG. 1).

In some embodiments processor 48 classifies installed applications and deduces demographic parameters of users using machine learning algorithms, e.g., supervised and/or unsupervised learning algorithms. Supervised learning algorithms are typically trained on labeled examples, i.e., input for which the desired output is known. Unsupervised learning algorithms operate on unlabeled examples, i.e., input for which the desired output is unknown. The algorithms typically use the collected traffic (per user) to create models, which have two functions: estimating the installed applications from network traffic, and creating classifiers of the installed applications, and their usage pattern over time to generate a demographic profile of the user.

In a typical demographic profiling model, in accordance with an embodiment that is described herein, the input to the model comprises an estimated set of installed mobile applications and their respective usage patterns (e.g., characteristic days in the week, time-of-day or duration of utilization) over time, and the model output comprises one or more demographic attributes of the user.

The configuration of demographic classification system 40 shown in FIG. 1 is an example configuration, which is chosen purely for the sake of conceptual clarity. In alternative embodiments, any other suitable configuration can be used for implementing the demographic classification system. Certain elements of demographic classification system 40 can be implemented using hardware, such as using one or more Application-Specific Integrated Circuits (ASICs) or Field-Programmable Gate Arrays (FPGAs) or other device types. Additionally or alternatively, certain elements of demographic classification system 40 can be implemented using software, or using a combination of hardware and software elements.

Typically, processor 48 comprises a general-purpose computer, which is programmed in software to carry out the functions described herein. The software may be downloaded to the computer in electronic form, over a network, for example, or it may, alternatively or additionally, be provided and/or stored on non-transitory tangible media, such as magnetic, optical, or electronic memory.

Demographic Profiling Based on Estimated Classes of Installed Applications and their Usage Patterns Over Time Terminals of mobile networks are personal and typically comprise personal information of the user. Accordingly, each user selects applications to install on his or her terminal from an almost endless number of possibilities. The specific combination of applications installed on a terminal, possibly in combination with their respective usage patterns, may therefore be used as a demographic fingerprint of the user who selected them.

In some embodiments, demographic classification system 40 produces a demographic profile of a certain user by analyzing the traffic of the user's terminal (whether traffic of a recognized or of an unrecognized application), classifying the traffic into classes of applications, thereby creating clusters of applications that are indicative of demographic attributes, and creating a demographic profile for the user based on the specific combination of classes of installed applications and their usage patterns, typically using machine learning techniques.

An application installed on the user terminal may be unrecognized for a variety of reasons. In some cases, the application has not been encountered before by system 40. For example, an application may be entirely new or a previously-unknown variant of a known application. In other cases, the application traffic is encrypted or otherwise inaccessible. Other scenarios are also possible. In the context of the present patent application and in the claims, any and all such cases are referred to as "unrecognized applications." In some embodiments, the disclosed techniques classify the traffic of a given user, including traffic of unrecognized applications, into classes or types of applications, rather than identifying the exact identity of each application.

System 40 may classify traffic into application classes using any suitable characteristic of the traffic. For example, media streaming and to some extent Voice over IP (VoIP) applications tend to use small packets at relatively fixed inter-packet intervals. To this extent, Media Streaming can be differentiated from VoIP given that media streaming is unidirectional (as opposed to a VoIP conversation) and tends to last longer than VoIP.

As another example, applications for data uploading and downloading can be identified. For example, file transfer operations typically consume high bandwidth, use large packets, and are typically highly asymmetric in terms of the ratio between upload and download. In terms of usage pattern, the ratio between upload and download, as well as reading to writing ratio can be used for classification. For example, in social network applications, women tend to write more (higher relative volume of uplink traffic) and men usually read more (higher relative volume of downlink traffic). Another example is the duration of utilization of specific applications, or average connection length, which help to create demographic profiling for relevant applications.

In some embodiments, one or more applications, such as the most commonly used applications and/or the least-used applications by network users, may be removed from the applications list before classification in order to obtain higher classification accuracy. Typically, the most commonly used applications are removed under the assumption that they provide little demographic information. The least-used applications are typically removed under the assumption that their statistics are too noisy.

Nevertheless, in some embodiments the usage pattern provides useful demographic insight even for extremely common applications. For example, social-network applications are in common use, regardless of demographics. The way such applications are used, however, may differ considerably from one demographic group to another. As noted above, women are typically characterized as contributing content to social networks, whereas men are typically characterized as readers or followers. Under this assumption, system 40 may use the ratio between uplink and downlink traffic in a social-network application as an indicator of gender: A social-network usage pattern characterized by considerable uplink traffic (from the terminal) may characterize women, whereas a social-network usage pattern characterized by little uplink traffic may characterize men.

Other usage parameters, e.g., activity hours during the day or relative network bandwidth as compared to the rest of the population, can also be used by system 40 in conjunction with application classification to deduce demographic attributes of users.

In extreme cases, system 40 may only be able to classify the metadata of given traffic to a rough estimate of the type of application, e.g., user-to-user message communication, short messaging, Web surfing or media streaming. Nevertheless, the disclosed techniques are able to deduce demographic attributes of pertinent users from this sort of classification.

Consider, for example, a 25 year-old, single economist living and working in a leading financial services firm in Manhattan. This user is characterized by conducting web surfing in short intervals during business hours, as a result of applications she is using (e.g., financial news and real-time stock quotes) and spending long hours on a social network and a live chat, typically during evenings and weekends.

Another example is a 60 year-old car technician and football fan from Athens, Greece, with children living abroad. This user installs on his smartphone video streaming applications for watching local football games, typically during Saturday and Sunday, and a VoIP application to chat with his children abroad, typically in evenings and weekends. During the weekly business hours he consumes data from databases (e.g., car spare parts).

The above examples show completely different profiles, usage pattern and installed applications, and hence, easy to create demographic profiles. Other examples may comprise people in the same age, from the same ethnic origin and mother tongue, living in the same city and working for the same employer, but of different gender and having completely different hobbies and usage patterns, and hence divided into partially overlapping but still different demographic profiles.

Typically, system 40 carries out the disclosed demographic profiling schemes without having to access or analyze the traffic content. This feature enables the disclosed techniques to operate on encrypted traffic, to handle foreign-language traffic, or to process traffic that is inaccessible for any other reason. Moreover, the computational complexity of content analysis is eliminated. The usage patterns of the various application classes are also used as an attribute for demographic profiling, in addition to the combination of classified installed applications.

In another embodiment, the machine learning techniques allows for dynamic demographic profiling that tracks added or removed applications or application classes over time. Accordingly, the network operator (or other recipient of the model output) may update its activities with respect to the updates of the user's demographic profile.

In some embodiments, system 40 collects the network traffic passively, without installing any software on terminals 20.

Figure 2:
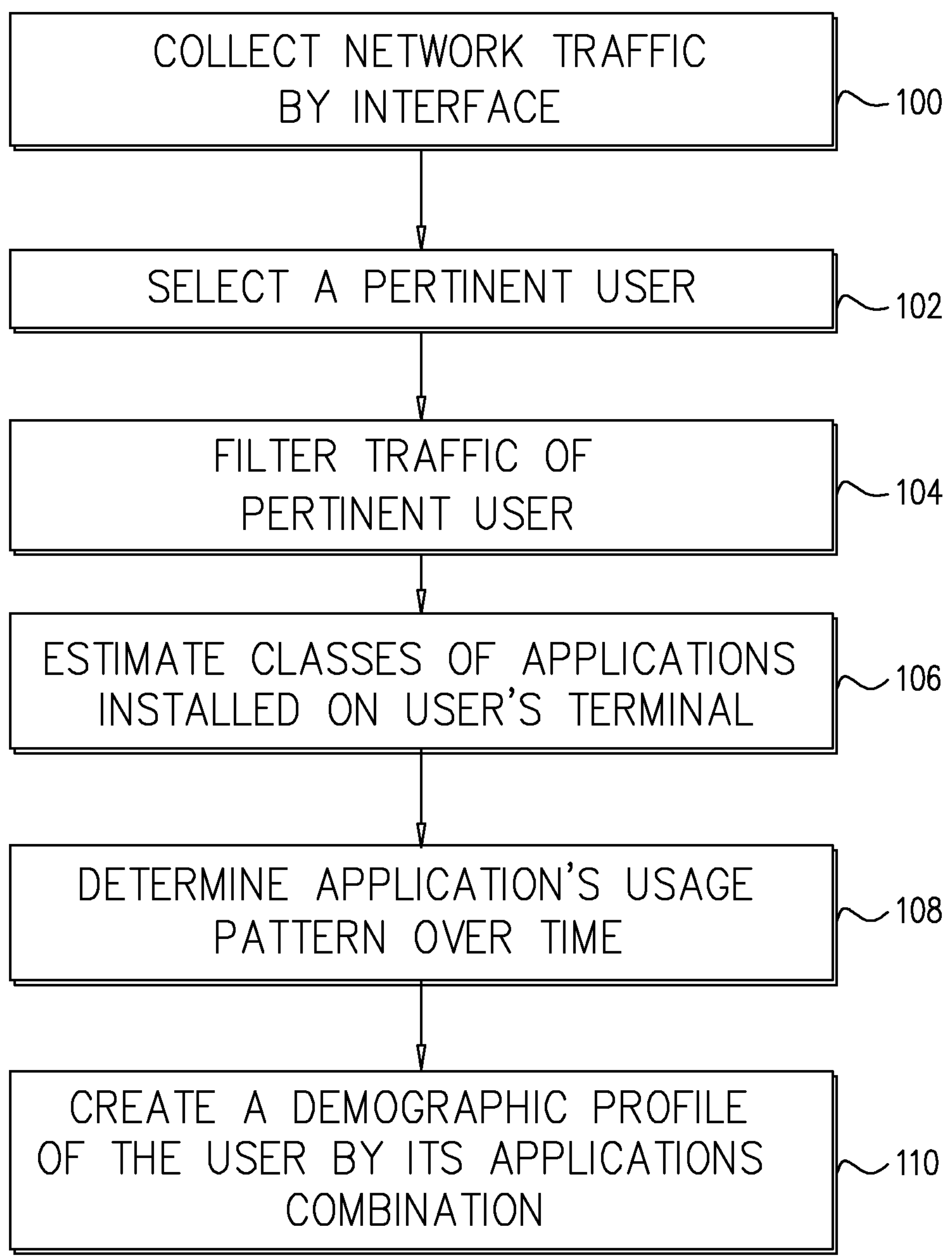
FIG. 2 is a flow chart that schematically illustrates a method for creating a demographic profile of a mobile network user based on installed mobile applications and their usage patterns, in accordance with an embodiment that is described herein.

FIG. 2 is a flow chart that schematically illustrates a method for creating a demographic profile of a mobile network user based on installed mobile applications and their usage patterns, in accordance with an embodiment that is described herein. The method begins with interface 46 collecting traffic from one or more networks of system 22, at a network traffic collection step 100. Typically, a mobile network has a range of thousands to millions of users, each user has at least one terminal, and hence, the collected traffic may relate to millions of terminals and communication sessions. In some embodiments interface 46 may pre-filter the traffic, e.g., collect traffic of specific users of interest.

At a user selection step 102, processor 48 selects a pertinent user (typically by International Mobile Subscriber Identity (IMSI)) for traffic filtering. In an embodiment, the user selection may be done by a predefined list of IMSIs or other attributes, in order to target specific users. In other embodiment the user selection may be done randomly. At a traffic filtering step 104, processor 48 filters the traffic to obtain the traffic of the user of interest. In some embodiments this filter may be performed by the IP address or IMSI of the pertinent user's terminal 20.

At an application class estimation step 106, processor 48 estimates classes of applications installed on the user terminal in question, based on the collected traffic of that user. In some embodiments, application class estimation may be done directly from the user traffic, e.g., by recognizing protocol features that are indicative of a specific application or family of applications. For example, demographic profiling can use classes based on application ontology metadata as provided by the application store (e.g., games, news, productivity, travel, finance). When the true application information is known, the disclosed technique can get this kind of metadata from the application store. Alternatively, the disclosed techniques use this data from the application store while building the demographic profiling models.

In other embodiments, processor 48 uses machine learning models in order to deduce that certain traffic corresponds to a certain installed application.

At a usage pattern determination step 108, processor 48 determines the respective usage patterns of the pertinent application classes over time. The usage patterns are typically used in addition to the estimated list of classes of installed applications, i.e., to complement the information obtained from the list. Usage attributes may comprise, for example, number of times a specific application class is used by a given user and terminal per day, the usage time during the day, duration of utilization, and number of users at the same time (for example, in case of interactive online gaming).

At a demographic profiling step 110, processor 48 uses the estimated classes, and the usage patterns of the installed application classes, to create a demographic profile of the user. In an embodiment, processor 48 uses one or more classification models for this purpose. These models receive a list of classes and usage patterns of installed applications (per terminal) as input, and output one or more demographic attributes of the user on whose terminal the applications are installed. Examples of demographic attributes are: age, gender, ethnic origin, mother tongue, marital status, education, occupation, employment, income, number of people in household, and residence type. Additionally or alternatively, any other suitable demographic attributes can be estimated. In some embodiments, the classification may comprise a confidence score for one or more of the demographic attributes.

In another embodiment a classification model may comprise predefined rules. For example, teenager gaming applications may be used to classify the user's age in accordance with a certain rule.

Typically, such classification models are based on machine learning techniques. Processor 48 may use several types of learning algorithms (e.g., supervised learning, unsupervised learning, reinforcement learning and/or deep learning). In some embodiments processor 48 is configured to use one or more such algorithms (standalone, or in conjunction with one another), e.g., supervised learning, unsupervised learning and a hybrid between supervised and unsupervised learning algorithms.

In an embodiment of using supervised learning algorithms, a network operator may install agent software in one or more of the terminals of its demographically-known users. This agent may collect a list of installed applications and processor 48 may apply supervised learning algorithms to assist creating one or more classification models based on this data-set of known demographic attributes and applications list. These classification models may be applied subsequently to classify users which are not demographically-familiar to the network operator, such as users of prepaid terminals. In this embodiment, the models may use a combination of supervised and unsupervised algorithms to create classes of unrecognized applications by the combination of above techniques together with usage patterns which are assisting the characterization of demographic profiling.

In another embodiment, processor 48 may rely solely on unsupervised learning. Unsupervised learning may be used, for example, during the initial stages of the modeling process, when encountering lists of applications that are considerably different from the lists known to the existing models, or wherever otherwise appropriate. In practice, processor 48 will typically use a suitable combination of supervised and unsupervised techniques. In some embodiments, system 40 may use metadata available on the application store ("app-store") to assist in training the classification model. Application metadata available on the app-store may comprise, for example, application size, descriptive text, popularity, ranking, and category/ontology. In an embodiment, system 40 may query this metadata for recognized applications, and use it in clustering unrecognized applications using non-supervised learning. For example, system 40 may use the descriptive text available for a recognized application on the app-store, as input for Information Retrieval (IR) based algorithms. Such an algorithm may compare the descriptive text of two applications based on suitable IR metrics, and measure the similarity between them.

It will thus be appreciated that the embodiments described above are cited by way of example, and that the present disclosure is not limited to what has been particularly shown and described hereinabove. Rather, the scope of the present disclosure includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A system, comprising:

an interface, which is configured to receive traffic from a mobile network; and a processor, which is configured to:

analyze network traffic of a communication terminal of a user to determine a plurality of characteristics of the network traffic, wherein the traffic is of a plurality of unrecognized applications, estimate, from the plurality of characteristics, a plurality of classes of the unrecognized applications that are installed on the communication terminal, without identifying the unrecognized applications, exclude from the plurality of classes one or more of the plurality of classes corresponding to at least one of applications that are most commonly used or applications that are least-used, create a combination of applications that are indicative of demographic attributes using the plurality of classes after excluding the one or more of the plurality of classes from the plurality of classes to remove the at least one of applications that are most commonly used or applications that are least-used from the combination of applications, determine a respective usage pattern of each of the plurality of classes over time after excluding the one or more of the plurality of classes from the plurality of classes, and dynamically deduce and update, by tracking added or removed applications or classes over time and using machine learning models, a demographic profile of the user of the communication terminal from the combination of applications and the respective usage pattern of each of the plurality of classes after excluding the one or more of the plurality of classes from the plurality of classes.

2. The system according to claim 1, wherein the processor is configured to estimate the plurality of classes and deduce the demographic profile irrespective of content of the network traffic.

3. The system according to claim 1, wherein the processor is configured to analyze the network traffic passively, without communicating with the communication terminal.

4. The system according to claim 1, wherein at least part of the network traffic is encrypted.

5. The system according to claim 1, wherein the processor is configured to obtain metadata of a recognized application from the application store, to assess a similarity between the metadata and attributes of one of the plurality of unrecognized applications installed on the communication terminal, and to classify the one of the plurality of unrecognized applications based on the similarity.

6. The system according to claim 1, wherein the processor is configured to exclude at least one class prior to deducing the demographic profile.

7. The system according to claim 1, wherein the demographic profile comprises one or more demographic attributes, and wherein the processor is configured to assign a confidence score to at least one of the demographic attributes.

8. The system according to claim 1, wherein the demographic profile comprises at least one demographic attribute selected from a group of attributes consisting of age, gender, ethnic origin, mother tongue, marital status, education, occupation, employment, income level, number of people in household and residence type.

9. A method, comprising:

receiving network traffic from a mobile network relating to a communication terminal of a user;

analyzing the network traffic of the communication terminal of the user to determine a plurality of characteristics of the network traffic, wherein the traffic is of a plurality of unrecognized applications;

estimating, from the plurality of characteristics, a plurality of classes of the unrecognized applications that are installed on the communication terminal, without identifying the unrecognized applications;

excluding from the plurality of classes one or more of the plurality of classes corresponding to at least one of applications that are most commonly used or applications that are least-used;

creating a combination of applications that are indicative of demographic attributes using the plurality of classes after excluding the one or more of the plurality of classes from the plurality of classes to remove the at least one of applications that are most commonly used or applications that are least-used from the combination of applications;

determining a respective usage pattern of each of the plurality of classes over time after excluding the one or more of the plurality of classes from the plurality of classes; and dynamically deducing and updating, by tracking added or removed applications or classes over time and using machine learning models, a demographic profile of the user of the communication terminal from the combination of applications and the respective usage pattern of each of the plurality of classes after excluding the one or more of the plurality of classes from the plurality of classes.

10. The method according to claim 9, wherein analyzing the network traffic, estimating the plurality of classes, and deducing the demographic profile are performed irrespective of content of the network traffic.

11. The method according to claim 9, wherein analyzing the network traffic is performed passively, without communicating with the communication terminal.

12. The method according to claim 9, wherein at least part of the network traffic is encrypted.

13. The method according to claim 9, wherein analyzing the network traffic comprises obtaining metadata of a recognized application from the application store, assessing a similarity between the metadata and attributes of one of the plurality of unrecognized applications installed on the communication terminal, and classifying the one of the plurality of unrecognized applications based on the similarity.

14. The method according to claim 9, wherein analyzing the network traffic comprises excluding at least one class prior to deducing the demographic profile.

15. The method according to claim 9, wherein the demographic profile comprises one or more demographic attributes, and wherein deducing the demographic profile comprises assigning a confidence score to at least one of the demographic attributes.

16. The method according to claim 9, wherein the demographic profile comprises at least one demographic attribute selected from a group of attributes consisting of age, gender, ethnic origin, mother tongue, marital status, education, occupation, employment, income level, number of people in household and residence type.

* * * * *